Sept. 26, 1939.   I. M. LADDON ET AL   2,174,422
FLAP CONTROL MECHANISM
Filed Nov. 18, 1936
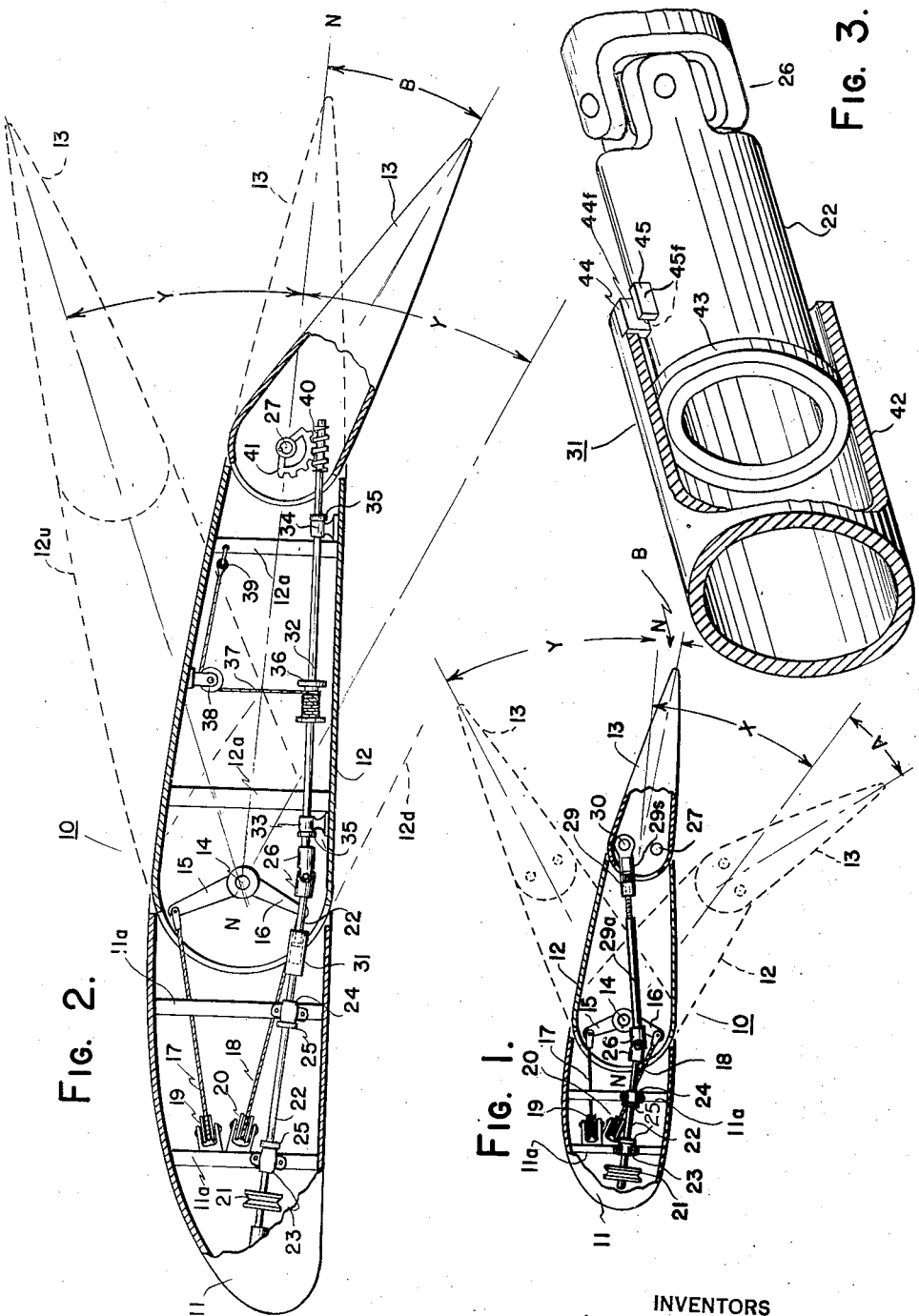
INVENTORS
I. M. LADDON & H. K. GROWALD.
BY James M. Clark
ATTORNEY Patented Sept. 26, 1939

2,174,422

UNITED STATES PATENT OFFICE 2,174,422

FLAP CONTROL MECHANISM

Isaac M. Laddon, San Diego, and Henry K. Growald, Mission Beach, Calif., assignors to Consolidated Aircraft Corporation, a corporation of Delaware Application November 18, 1936, Serial No. 111,414

16 Claims. (Cl. 244—42)

This invention relates to control surfaces and flaps for aircraft wherein an auxiliary flap moves in conjunction with a main control surface and more particularly to constructions and operating mechanism whereby an auxiliary flap may be preset or adjusted at will to assume varying angular dispositions with respect to the movable control surface.

An object of our invention lies in the provision of means for adjusting the auxiliary flap position whereby the auxiliary flap progressively increases its angular deviation with continued movement of the movable surface and conversely on return movement automatically decreases the angular deviation until a point is reached, depending on the original pre-set angle, where the moving surface and its auxiliary flap lie on the same longitudinal axis i. e., where the median lines of each are alined and continuous.

A further object of our invention is to provide control mechanism whereby, whenever the movable surface exceeds a predetermined angle with respect to its normal position, the auxiliary flap is automatically released from the pre-set angular displacement and returned to its neutral position on an axis parallel to that of the movable surface.

Still another object of our invention is to provide in an airfoil a method of varying the camber thereof to provide an airfoil shape which will have high lift characteristics for landing and take-off purposes yet which can be instantaneously restored to its normal high speed characteristic.

A further object is to provide a flap of a type adapted to be used in pairs as ailerons and having a relative differential movement with respect to each other such that the downwardly moving flap changes its angular deviation from the neutral axis at a greater rate than does the upwardly moving flap.

These and other objects of our invention will be better understood from the following description and drawing of embodiments thereof in which like numbers designate like parts and in which, Fig. 1 shows in cross-section, an airfoil comprising a main section, a movable surface, and an auxiliary flap adapted for differential movement with the said surface, Fig. 2 shows a progressive development of the airfoil shown in Fig. 1 wherein is provided an automatic release device operating by reason of the above mentioned differential action, and Fig. 3 illustrates in detail the release device as incorporated in the construction of Fig. 2.

The airfoil 10 has a relatively fixed main section 11, an intermediate pivotal section 12, which hereafter will be termed the movable surface 12, and a trailing section or flap 13; the three sections in their relationship with each other presenting a typical airfoil section.

The movable intermediate surface 12 is pivoted at 14 to the main section 11 and is provided with horns 15 and 16 connecting to cables 17 and 18 respectively which run over the sheaves 19 and 20 to the pilot's cockpit terminating there in a control means of conventional type now widely used on ailerons or other movable surfaces. Thus it is apparent that a pull transmitted through cable 17 will effect a raising of the movable surface 12 to some new position angularly above its normal axis N—N and in the same manner cable 18 serves to position the movable surface 12 obliquely to and below the normal position N—N.

Within the fixed wing section 11 is mounted pulley 21, or any suitable means by which rotary motion can be transmitted from the pilot's cockpit to the shaft 22. Bearings 23 and 24 mounted on crosspieces or spars 11a of the wing section support shaft 22 and collars 25 thereon prevent axial play of the shaft 22 and hence its only possible motion is one of revolution. Shaft 22 terminates in the universal joint 26.

Just as the movable surface 12 is pivoted to the main section 11 by a pivot 14, so also is the flap 13 in turn pivoted to the movable surface 12 through the pivot 27. This pivot 27 may lie on the axis of symmetry of flap 13 or it may be offset somewhat as dictated by design considerations.

Referring particularly to Fig. 1 it is seen that the control means for flap 13 comprises a turnbuckle device 29, pivotally connecting to the flap 13 at pivot 30. The turnbuckle 29 has a rod-like extension 29a connecting to the previously mentioned universal joint 26, hence on rotation of pulley 21, the torque thereof is transmitted through shaft 22, universal joint 26, and rod 29a to turnbuckle 29, resulting in an extension or contraction of the latter which causes the flap 13 to move about its pivot 27 and assume an oblique position relative to its normal "in-line" position with movable surface 12. To prevent separation of the parts of the turnbuckle 29, the threaded end of rod 29a carries a stop 29s axially slidable in a slotted portion of the turnbuckle body which prevents separation of the parts and also dictates the maximum throw of the flap 13, with respect to surface 12, to some angle such as "A".

An important feature of our construction resides in the positioning of the universal joint 26 with respect to the movable surface pivot 14 and this position once determined is fixed by the rod 22 and stop collars 25. To provide an automatic differential movement between flap 13 and surface 12 the pivotal center of joint 26 must be offset from the pivot 14. Then with the flap 13 pre-set to some angle B by extension of turnbuckle 29, motion of movable surface 12 below its normal position N—N carries flap 13 with it and results in an increasing angular deviation of the flap 13 until in some position of throw represented by angle X the angular deviation of the said flap 13 is as shown by A, of greater magnitude than the original pre-set angle B.

Movement of surface 12 upward from the position just mentioned results in a decreasing angular deviation of flap 13. At the normal axis N—N this deviation again reaches the pre-set angle B and at some angle Y (determined by the pre-set angle B and the positioning of universal joint 26 with respect to pivot 14) the angular deviation reaches zero so that movable surface 12 and flap 13 are substantially alined and obliquely disposed above the neutral line N—N. It is obvious that the pre-set angle B can be changed or reduced to zero at any time, or relative positions of the sections of wing 10, controlled as desired by the pilot.

Referring to Fig. 2 a modification is illustrated wherein the pre-set angle B is automatically reduced to zero thus returning the flap 13 to an alined position with respect to movable surface 12 whenever a predetermined angular throw of the movable surface 12 is exceeded. Such a control angle may be of a magnitude of the order of angle Y as shown and this critical angle Y may be equal or different for the "up" or "down" positions.

The mechanism by which the above is made possible consists of a release coupling 31 inserted in the shaft 22 just forward of universal joint 26. This coupling has a body portion 42, as shown in Fig. 3 which may be threaded or otherwise fixed to the forward portion of rod 22, which is hollow and of greater internal diameter than the said rod 22. At its rear rim an inwardly projecting block or stop 44 is formed. The rear portion of rod 22 carrying universal joint 26 projects into the hollow body 42 past the said projection 44 and carries at its forward extremity a stop ring 43, threaded or otherwise fixed thereon. The purpose of this ring 43 is to limit the axial movement of the rear portion of rod 22 with respect to its forward part by striking either against lug 44 or the forward wall of body 42 and also to provide a sliding support for rod 22.

A lug or projection 45, having surfaces substantially parallel to those of lug 44, projects from the outer surface of the rear part of rod 22 at about the midpoint of its axial travel with respect to body portion 42. This projection 45 extends outwardly a sufficient distance to insure its contacting one or the other of the opposed faces 44f of lug 44, yet not so far as to prevent its freely sliding within the hollow opening in body 42.

With such a construction as long as the lugs 44 and 45 are in contact the forward and rearward parts of rod 22 must rotate as a unit but when the rearward part axially approaches or recedes from the forward part to the point where the opposed lug faces 44f and 45f no longer contact each other, then the rearward part can rotate apart from the forward part of rod 22 and vice versa so that the flap 13 can be automatically returned to its neutral "in-line" position with respect to movable surface 12.

This action is accomplished by a gear segment 41 fixed to flap 13 concentrically with its pivot 27 meshing with a worm gear 40 on shaft 32. Bearings 33 and 34 mount this shaft 32 within the intermediate wing section 12 and stop collars 35 prevent any axial movement of the said rod with the said surface. The end of shaft 32 opposite from worm gear 40 connects to universal joint 26 and positioned intermediate these ends is a cylindrical drum 36 to which connects a rubber cord or resilient cable 37 passing through sheave 38 to anchor at 39 to a fixed portion 12a of movable surface 12. This cable 37, or any suitable tensioning device such as a spring, is given an initial tension and then whenever flap 13 is pre-set to some angle B through manipulation of pulley 21 causing rotation of rod 22, coupling 31, universal joint 26, rod 32, and hence drum 36, the rubber cord 37 winds up on the drum and coincidentally adds to the tension therein.

Whenever the movable surface 12 is swung up or down to its critical angle Y, as indicated by the dotted position 12u and 12d, the coupling stops 44 and 45 thereupon disengage by reason of the axial movement of stop 45 induced by the eccentricity of universal joint 26 with respect to pivot 14. At this time the tension in cable 37 is free to act on drum 36 to rotate it to its neutral position which at the same time restores flap 13 to its "in-line" position with respect to movable surface 12. As soon as the surface 12 passes through the critical angle Y, on being returned toward its neutral position, the stops 44 and 45 again reach an alignment where they will engage each other and again the line of control is re-established through coupling 31 so that the flap 13 can be moved or pre-set by the pilot.

These and other desirable objects and advantages of the present invention will be illustrated in the accompanying drawing and described in the specification, a preferred embodiment being disclosed by way of illustration only, for since the underlying principles may be incorporated in other specific devices, it is not intended to be limited to the one here shown, except as such limitations are clearly imposed by the appended claims.

What we claim is:

1. In an airfoil in combination, a relatively fixed main section, an intermediate section pivotally fixed thereto, a trailing edge section pivotally attached to the said intermediate section, and means incorporating release mechanism and tension means operating to variably determine the angular position of the said trailing edge section with respect to the said intermediate section, the said means also operating to automatically restore the said trailing edge section to an alined position with respect to the said intermediate section whenever the latter exceeds predetermined limits of movement.

2. The combination in an airfoil composed of a main portion and articulated trailing sections comprising a movable surface and a flap member, of means for raising or lowering the said articulated sections, means for variably fixing the angular position of the said flap member with respect to the said movable surface, and restoring mechanism actuated by movement of the latter surface such that the said flap is returned to a neutral position on exceeding predetermined limits.

3. The combination in an airfoil, of a flap pivotally carried by a movable surface, an arm extending from said flap, a control linkage associated with said arm and incorporating means whereby the angular position of the said flap may be set with respect to the said movable surface and release mechanism and tension means whereby the said flap is automatically restored to a neutral position whenever movement of the movable surface exceeds predetermined limits.

4. The combination in an airfoil, of a pivoted flap carried by a movable surface, control linkage to the pivoted flap whereby the said flap is adjustably positioned, and means comprising a telescopic coupling, automatically disengaging whenever the said movable surface exceeds a predetermined range of movement, and a tension device operating to restore the said flap to its neutral position on disengagement of said coupling, the said means being interconnected with the said control linkage such that positioning of the said flap angularly to its neutral position increases the initial tension of the said device.

5. In a variable camber airfoil, a relatively fixed leading airfoil section, an intermediate movable section pivotally carried at the rear of said leading section, a trailing section pivotally carried at the rear of said intermediate section, control means for rotating said intermediate section with respect to said fixed section, second control means for rotating the said trailing section with respect to said intermediate section, and automatic means comprising release mechanism and a restoring device associated with said second control means whereby the latter is made inoperative and the said trailing section is caused to return to an alined position with respect to the said intermediate section when the latter exceeds predetermined rotational movement with respect to said fixed section.

6. In control mechanism for varying the relative angles of a movable surface and an auxiliary flap hinged thereto, the combination of a torsion shaft, a releaseable slide coupling associated therewith, and torsion means operable to rotate a part of said shaft upon release of said coupling whereby the auxiliary flap is moved relative to said movable surface.

7. In a variable camber airfoil consisting of a plurality of sections, adjusting mechanism comprising a torque rod, means for rotating said rod, connecting links to the trailing section comprising a clutch member normally engaged but releaseable by movement of an intermediate section exceeding predetermined amplitude, torque means automatically operating upon release of said clutch and means to operably connect said torque rod to said trailing section.

8. In control mechanism for varying the relative angles of a movable surface and an auxiliary flap pivoted thereto, the combination of automatic release mechanism and torque means automatically operating upon release of said mechanism to move the auxiliary flap with respect to said movable surface.

9. In an actuating system for aircraft control surfaces, a pivoted connection to a control surface including a shank member fitted with an internally threaded sleeve portion adjacent the free end thereof, a connecting rod having a threaded portion at one end for inter-engagement with the said sleeve portion, means to prevent separation of the said threaded portions, a rotatably mounted shaft flexibly connected to the opposite end of said connecting rod, and means to cause rotation of said shaft.

10. In a system for aircraft control, the combination with an airfoil of a movable surface, an auxiliary flap pivoted thereto at a point removed from the longitudinal axis of said flap, a control rod extending through the leading edge of said flap and incorporating extensible means whereby the angular position of said flap may be set with respect to the movable surface upon actuation of said means, a second control rod rotatably mounted within the said airfoil and pivotally associated with the first said control rod at a point removed from the pivotal axis of the said movable surface whereby movement of the movable surface progressively changes the angular position of the said flap.

11. In a system for aircraft control, the combination with an airfoil, of a movable surface, an auxiliary flap pivoted thereto at a point removed from the longitudinal axis of said flap, an extensible control element extending through the leading edge of said flap and incorporating an internally threaded sleeve portion, a connecting rod threaded at one end for engagement within the said sleeve portion, means to prevent disengagement of the said threaded portions, a rotatably mounted shaft flexibly connected to the opposite end of said connecting rod, means to cause rotation of said shaft whereby the angular position of said flap may be set with respect to said movable surface and whereby upon movement of said movable surface said flap progressively changes its angular position with respect to the set position.

12. In control mechanism for varying the relative angles of a movable surface and an auxiliary flap hinged thereto, the combination of a torsion shaft, an extensible slide coupling associated therewith, and torsion means operable to rotate a part of said shaft under control of said coupling, whereby the auxiliary flap is moved relative to said movable surface.

13. The combination with an airfoil composed of a main portion and articulated trailing sections comprising a movable surface and a flap member, of means for pivotally actuating the said articulated sections, means for variably setting the angular position of the said flap member with respect to the said movable surface during flight, and means preset by said setting means for returning the said flap to its original position at a certain position of the said movable surface, all of said means being wholly contained within the surface outlines of said airfoil.

14. In a variable camber airfoil, a relatively fixed leading airfoil section, an intermediate movable section pivotally carried at the rear of said moving section, a trailing section pivotally carried at the rear of said intermediate section, controlling means for rotating said intermediate section with respect to said fixed section, second control means including an extensible slide coupling, for rotating the said trailing section with respect to said intermediate section and for automatically aligning the said trailing section with the intermediate section at a predetermined position of the latter with respect to the fixed section.

15. In a system for aircraft control, a combination in an airfoil and a movable surface, an auxiliary flap pivoted thereto at a point removed from the longitudinal axis of said flap, an extensible slide coupling extending through the leading edge of said flap into the interior of said intermediate section, a connecting rod adjustably connected with the slide coupling, a rotatably mounted shaft flexibly attached to the remaining end of said connecting rod and means to cause rotation of said shaft, said coupling, connecting rod and shaft all being contained wholly within the surface outlines of said airfoil and serving to variably adjust the angular position of said flap to said movable surface and to automatically return the flap to its original position at a certain position of the said movable surface.

16. In a variable camber airfoil consisting of a plurality of sections, an adjusting mechanism including a torque rod, means for rotating said rod, connecting links extending through the leading edges of certain of said sections, a clutch member actuated by movement of an intermediate section exceeding a predetermined amplitude, torque means automatically operating upon actuation of said clutch and means to operably connect said torque rod to said trailing section, the said adjusting mechanism and associated means being wholly contained within the exterior outlines of said airfoil in each of its adjusted positions.

ISAAC M. LADDON.
HENRY K. GROWALD.